United States Patent
Katagami et al.

(10) Patent No.: US 7,075,599 B2
(45) Date of Patent: Jul. 11, 2006

(54) COLOR FILTER SUBSTRATE AND MANUFACTURING METHOD THEREFOR, ELECTRO-OPTICAL APPARATUS, AND ELECTRONIC EQUIPMENT

(75) Inventors: Satoru Katagami, Hara-mura (JP); Kunio Maruyama, Misato-mura (JP); Keiji Takizawa, Toyoshina-machi (JP); Hisashi Aruga, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/932,313

(22) Filed: Sep. 2, 2004

(65) Prior Publication Data
US 2005/0064306 A1   Mar. 24, 2005

(30) Foreign Application Priority Data
Sep. 10, 2003   (JP)   ............... 2003-318438

(51) Int. Cl.
G02F 1/1335   (2006.01)
(52) U.S. Cl. ..................................... 349/106
(58) Field of Classification Search ............... 349/80, 349/84, 113, 114, 106, 108, 61, 62, 63, 96, 349/97, 104, 107, 109, 115, 56
See application file for complete search history.

(56) References Cited

U.S. PATENT DOCUMENTS

| | | | |
|---|---|---|---|
| 6,215,538 B1 | 4/2001 | Narutaki et al. | |
| 6,816,217 B1 * | 11/2004 | Sone | 349/114 |
| 2002/0126238 A1 | 9/2002 | Matsushita et al. | |

FOREIGN PATENT DOCUMENTS

JP   10-186347 A   7/1998

* cited by examiner

Primary Examiner—B. William Baumeister
Assistant Examiner—Dana Farahani
(74) Attorney, Agent, or Firm—Shinjyu Global IP Counselors

(57) ABSTRACT

A color filter substrate includes a transmissive base; a reflective film that is formed on the base; a plurality of coloring elements having different colors that is formed on the reflective film; and a plurality of banks formed on the reflective film between the plurality of coloring elements. The bank has a transmissive portion and a non-transmissive portion. The coloring elements are formed by jetting out droplets onto deposit regions that are defined by the banks by an inkjet technique. The transmissive portion of the bank exposes the reflective film. A sufficient area is provided for each coloring element, while a sufficient area of the reflective film is exposed.

12 Claims, 15 Drawing Sheets

Stripe-like pattern

Mosaic pattern

Delta pattern

COLOR FILTER SUBSTRATE AND MANUFACTURING METHOD THEREFOR, ELECTRO-OPTICAL APPARATUS, AND ELECTRONIC EQUIPMENT

BACKGROUND OF THE INVENTION

1. Field of the Invention

The present invention relates to a color filter substrate for use in liquid crystal devices and other such electro-optical devices, and to a method of manufacturing such color filter substrate. The present invention also relates to an electro-optical device having such color filter substrate. The present invention further relates to electronic equipments such as a portable phone, a portable information terminal, or other electronic equipments configured to use such electro-optical device.

2. Background Information

It is common in conventional practice for color to be displayed by a liquid crystal device, an organic EL device, or other such electro-optical device. A color filter substrate is incorporated into the interior of such electro-optical device. This color filter substrate is formed, for example, by forming three coloring elements of R (red), G (green), and B (blue) on a base made of transparent glass so that they form a predetermined pattern.

There are three known types of liquid crystal devices. The first is so-called a reflective type liquid crystal device in which external light such as the sun light or room light is reflected internally within the device such that the reflected light is displayed. The second is so-called a transmissive type liquid crystal device in which the light is emitted by a cold cathode tube, LED (light emitting diode) or other light source and passes through inside the liquid crystal device. The third is a semi-transmissive-reflective type liquid crystal device that has functions of both of the reflective and transmissive type liquid crystal devices.

In both the reflective and semi-transmissive-reflective type liquid crystal devices, when the display uses reflected light to display image, the external light passes through coloring elements of the color filter twice, which increases color absorption and reduces the display brightness. To solve this problem, reflective type liquid crystal devices that have within the pixel area an uncolored region, in other words an exposed reflective film, have been conceived. Japanese Patent Application Publication 10-186347 in FIG. 1 and on pages 3–4 shows such reflective type liquid crystal device. In this liquid crystal device, the passage of bright light through the exposed region of the reflective film prevents the reduction in brightness of the color display.

In the liquid crystal apparatus disclosed in Japanese Patent Application Publication 10-186347, since an exposed reflective film is placed inside the black mask, in other words since the exposed reflective film is placed in a region that is separate from the black mask, the available areas for the coloring elements are reduced.

In view of the above, it will be apparent to those skilled in the art from this disclosure that there exists a need for improved color filter substrate and method of manufacturing a color filter substrate that overcome the problems of the conventional arts. This invention addresses this need in the art as well as other needs, which will become apparent to those skilled in the art from this disclosure.

SUMMARY OF THE INVENTION

An object of the present invention is to provide a color filter substrate having sufficient areas where the reflective film is exposed as well as sufficient areas for the coloring elements. It is also an object of the present invention to provide a method of manufacturing such color filter substrate, an electro-optical device having such color filter substrate and an electronic equipment having such color filter substrate.

A color filter substrate of the present invention includes a transmissive base, a reflective film formed on the base, a plurality of coloring elements having different colors and formed on the reflective film, and a plurality of banks formed on the reflective film between the plurality of coloring elements. At least one of the banks has a transmissive portion and a non-transmissive portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2(*b*) is a cross sectional view of the color filter substrate in accordance with the embodiment of the present invention viewed line IIb—IIb of FIG. 1;

FIG. 3(*b*) is a cross sectional view of the element side substrate in accordance with the embodiment of the present invention viewed along line IIIb—IIIb in FIG. 3(*a*);

DETAILED DESCRIPTION OF THE PREFERRED EMBODIMENTS

Figure 1:
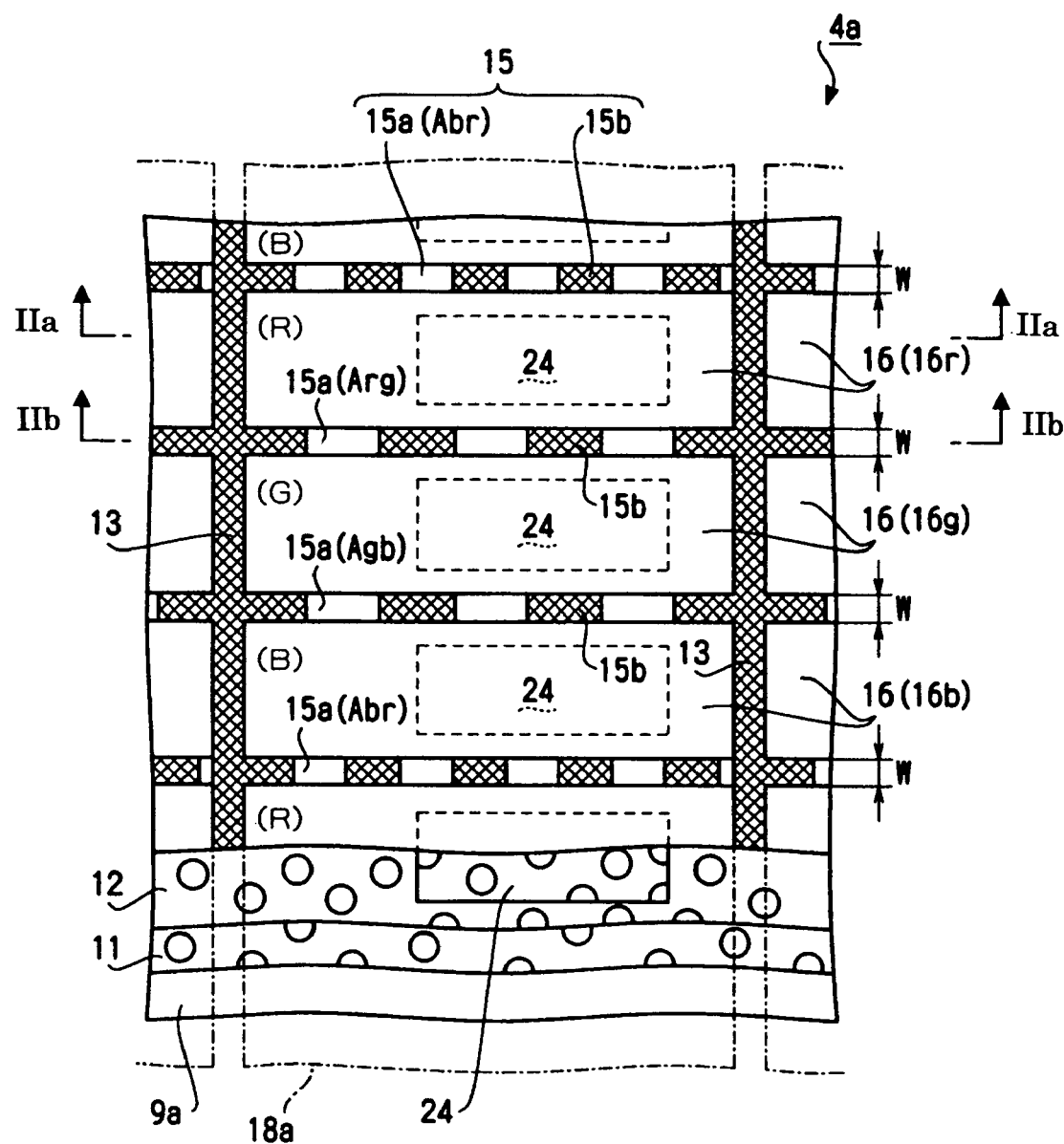
FIG. 1 is a plan view showing one pixel portion of the color filter substrate in accordance with an embodiment of the present invention.

To accomplish the aforementioned objectives, a color filter substrate of the present invention includes a transmissive base, a reflective film formed on the base, a plurality of coloring elements having different colors and formed on the reflective film, and a plurality of banks formed on the reflective film between the plurality of coloring elements. At least one of the banks has a transmissive portion and a non-transmissive portion. The term "transmissive" as used to describe the bank herein means having a light transmissivity rate higher than that of a coloring element, more specifically the light transmissivity rate of 50% or greater, and more preferably 80% or greater, against light rays of wavelength between 400 nm and 700 nm.

The color filter substrate of the present invention has a transmissive portion disposed on a bank that frames a coloring element, so as to expose the reflective film via the transmissive portion of the bank itself. Since the transmissive portion is provided on the bank, a larger region can be secured for the coloring element than the conventional structure in which a transparent region for exposing the reflective film is provided inside of the black mask. Accordingly, it is possible to provide a sufficient color saturation.

Hypothetically, an entire bank could be formed as a transmissive portion without any non-transmissive portion formed thereon. However, in such a case, if the coloring element does not require a large transmissive portion, the bank width would have to be made narrow, which may cause mixing of different colors between the two adjacent coloring elements across the narrow bank. Mixed colors would degrade the quality of the display of the color filter substrate. By contrast, by forming both a transmissive portion and a non-transmissive portion on the bank, it is possible to form a wide bank. Even when the coloring elements require only a small area of the transparent region, the bank between the coloring elements can still be formed wide so as not to cause the mixing of colors.

The color filter substrate of the present invention is constituted to dispose the coloring elements within a region framed by a bank, allowing the use of a droplet deposit technique such as an inkjet technique to form the coloring elements. Here, the ink jet technique refers to a technique whereby the material for the coloring element is jetted out of the nozzle as ink droplets and deposited at a desired location. The methods by which the ink is jetted out may include a method wherein a piezo element that vibrates on electricity imposed thereon is used to vary the internal volume of the nozzle to jet out the ink; a method wherein the ink in the nozzle is thermally expanded to jet out the ink; and any other desired droplet deposit methods. The use of an inkjet technique enables producing a coloring element in a simpler process and at a lower cost with a smaller ink consumption, as compared to conventional methods which use the photolithographic technique.

In the color filter substrate of the present invention, it is desirable to set an area of the transmissive portion based on a color of the coloring element that is adjacent to the transmissive portion. The applicant of the present invention has proposed a color filter substrate in Japanese Patent Application No. 2002-230291, in which transparent banks and transparent island-like bank regions are formed within pixel regions so as to obtain uncolored and bright reflected light through those uncolored reflective regions. Here, the size of the uncolored reflective region is closely related to the color of the coloring element. If three colors, R, G and B, are to be used as the coloring elements, the color balance of the color display can be modified freely according to the user's preference by varying the size of the uncolored reflective region for each of the R, G. and B colors. The same holds true for the present invention. That is, the brightness of each color may be adjusted by varying the area of the transmissive portion of the bank based on the color of the coloring element, thereby adjusting the color balance in the color display.

In the color filter substrate of the present invention, where a coloring element of a first color requires a transparent region whose area is $A_1$, a coloring element of a second color requires a transparent region whose area is $A_2$, then an area of a transmissive portion of a bank that is adjacent to the coloring element of the first color and the coloring element of the second color is $A_1/2+A_2/2$. That is, the area of the transmissive portion within the bank is set to be the sum of halves of the required areas of transparent portions of the coloring elements that are on both sides of the bank. In other words, a half of the area of the transparent region that is required by a coloring element is equally allocated to two adjacent banks that are on both sides of the coloring element.

In the color filter substrate of the present invention preferably further includes a light blocking member formed on the reflective film at one of first and second directions edges of the coloring elements, the first direction intersecting with the second direction. Furthermore, the banks are preferably formed at the other of the first and second directions edges of the coloring elements. The first and second directions are, for instance, longitudinal and latitudinal directions of the coloring element. In other words, the transmissive portion of the bank can be formed at the lateral edge of a coloring element, while the light blocking member can be formed at the longitudinal edge of the coloring element. Conversely, the transmissive portion of the bank can also be formed at the longitudinal edge of a coloring element, while the light blocking member can be formed at the lateral edge of the coloring element. The light blocking member, as referred to, functions as a so-called black mask, which renders a vivid color display.

In the color filter substrate of the present invention, widths of the plurality of banks are preferably constant regardless colors of the coloring element that are adjacent to the banks. In the color filter substrate of the present invention, the area of the transmissive portion of a bank may be set at a different value depending on the colors of the coloring elements that are on both sides of the transmissive portion. Even in such a case, it is still desirable to set the width of all banks equally. In other words, the areas of the non-transmissive portions are different in different banks. As in an embodiment of the present invention, by setting the widths of all banks at a constant value, it is easy to control the timing and the volume of droplet discharge in the production of coloring elements by a droplet deposit method such as an inkjet method. It is also possible to effectively prevent undesired mixing of colors between the coloring elements that are on both sides of a bank.

In the color filter substrate of the present invention, the transmissive portion and the non-transmissive portion are preferably disposed alternately within a bank. Accordingly, reflected light can be evenly brightened across a plane.

Figure 7:
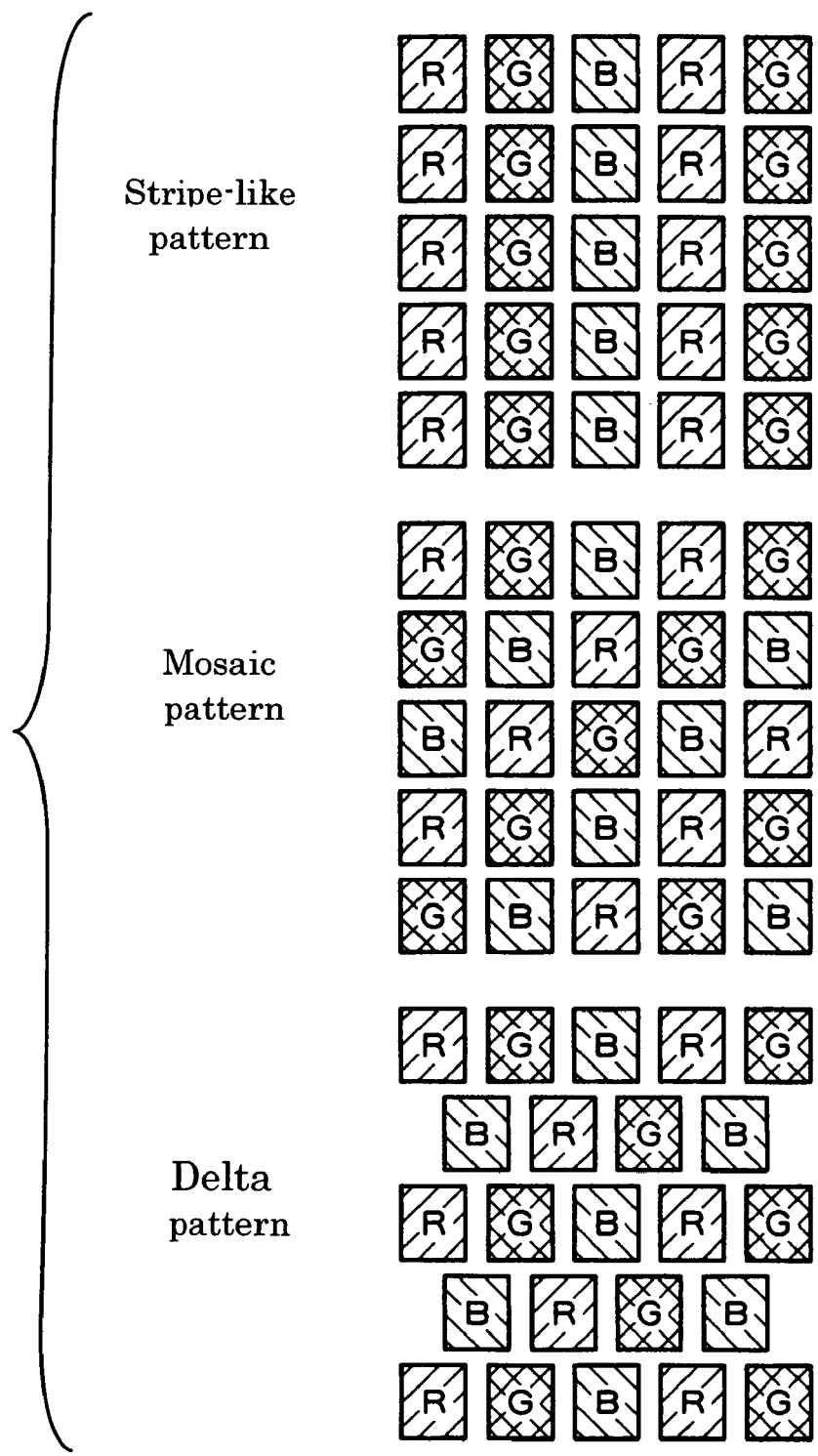
FIG. 7 are schematic views of different patterns of coloring elements R, G and B that are arranged in the color filter substrate of FIG. 1, namely: (a) stripe pattern, (b) mosaic pattern, and (c) delta pattern.

In the color filter substrate of the present invention, the plurality of coloring elements has three colors, and the coloring elements are disposed such that their colors form a stripe-like pattern. The colors of the plurality of colored members can have any three of the colors of R (red), G (green) and B (blue), C (cyan), M (magenta) and Y (yellow). It is desirable to have these colors arranged in a stripe pattern. Here, the stripe pattern means, for example, the pattern shown in FIG. 7($a$) where each of the three colors (R, G, and B in the example of FIG. 7) is arrayed in a straight longitudinal line, and the longitudinal line is repeated in the same order laterally using different colors in a sequence.

The color filter substrate of the present invention is adapted to be disposed opposite an element substrate that has a plurality of line wirings therein, such that the banks are adapted to be disposed opposite the line wirings. The banks are preferably sized to be thicker than the line wirings. In this case, it is desirable to form the bank wider in a plan view, than the line wiring so as to cover the entire line wiring. Since the line wiring that is disposed on the surface of the element substrate is non-transmissive to light, the line wiring functions as a black mask. A transmissive bank that is formed wider than the line wiring allows an effective utilization of the uncolored reflected light that passes through the bank.

In the color filter substrate having a line wiring covered within the transmissive bank, where a coloring element of a first color requires a transparent region whose area is $A_1$, a coloring element of a second color requires a transparent region whose area is $A_2$, and an area of said line wiring is $A_L$, then an area of a transmissive portion of a bank that is adjacent to said coloring element of the first color and said coloring element of the second color is $A_1/2+A_2/2+A_L$. Such an area allows an effective utilization of the uncolored reflected light passing through the transmissive portion of the bank.

Next, the method of manufacturing a color filter substrate of the present invention includes providing a base, forming a reflective film on the base, forming a plurality of banks on the reflective film between; at least one of the banks having a transmissive portion and a non-transmissive portion, and forming a plurality of coloring elements by depositing prescribed fluid in a plurality of deposit portions that are defined by the banks, the coloring elements having at least two different colors and being disposed so as to form a prescribed pattern.

The manufacturing method of the present invention preferably utilizes a droplet jetting technique such as an inkjet technique to form the coloring elements. Accordingly, the manufacturing process of the color filter substrate can be simplified, while the ink consumption can be reduced as compared to the conventional photo-lithographical process.

Next, the electro-optical apparatus related to the present invention is electro-optical apparatus including a color filter substrate of the foregoing constitution, and an electro-optical layer provided on the color filter substrate. Examples of such electro-optical apparatus may include, for example, liquid crystal display devices, organic EL apparatuses, plasma display apparatuses and other various apparatuses.

In the electro-optical apparatus of the present invention, the bank that frames the coloring elements on the color filter substrate and is built into the electro-optical apparatus is rendered transparent in itself so that it functions as an exposed portion of the reflective film. As compared to the conventional arrangement in which the exposed portion of the reflective film is formed inside the black mask, by forming the transmissive portion in the bank, a larger area is secured for the coloring element. Accordingly, it is possible to obtain sufficient color saturation. Thus, a display of various data can be performed in vivid colors.

An electronic equipment in accordance with the present invention includes the foregoing electro-optical apparatus and controlling means for controlling the electro-optical apparatus. Examples of such electronic equipment may include, for example, portable telephone sets, portable information terminal sets, PDAs (personal digital assistants) and various other equipments.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

COLOR FILTER SUBSTRATE AND ELECTRO-OPTICAL DEVICE

An example of the color filter substrate in accordance with the present invention and an electro-optical device in which the color filter substrate is used will now be described. In the following description, a semi-transmissive/reflective liquid crystal device, which is an active-matrix liquid crystal device that uses a TFD (thin film diode) as a two-terminal switching component, is given as an example. The present invention is of course not limited to this embodiment.

Figure 4:
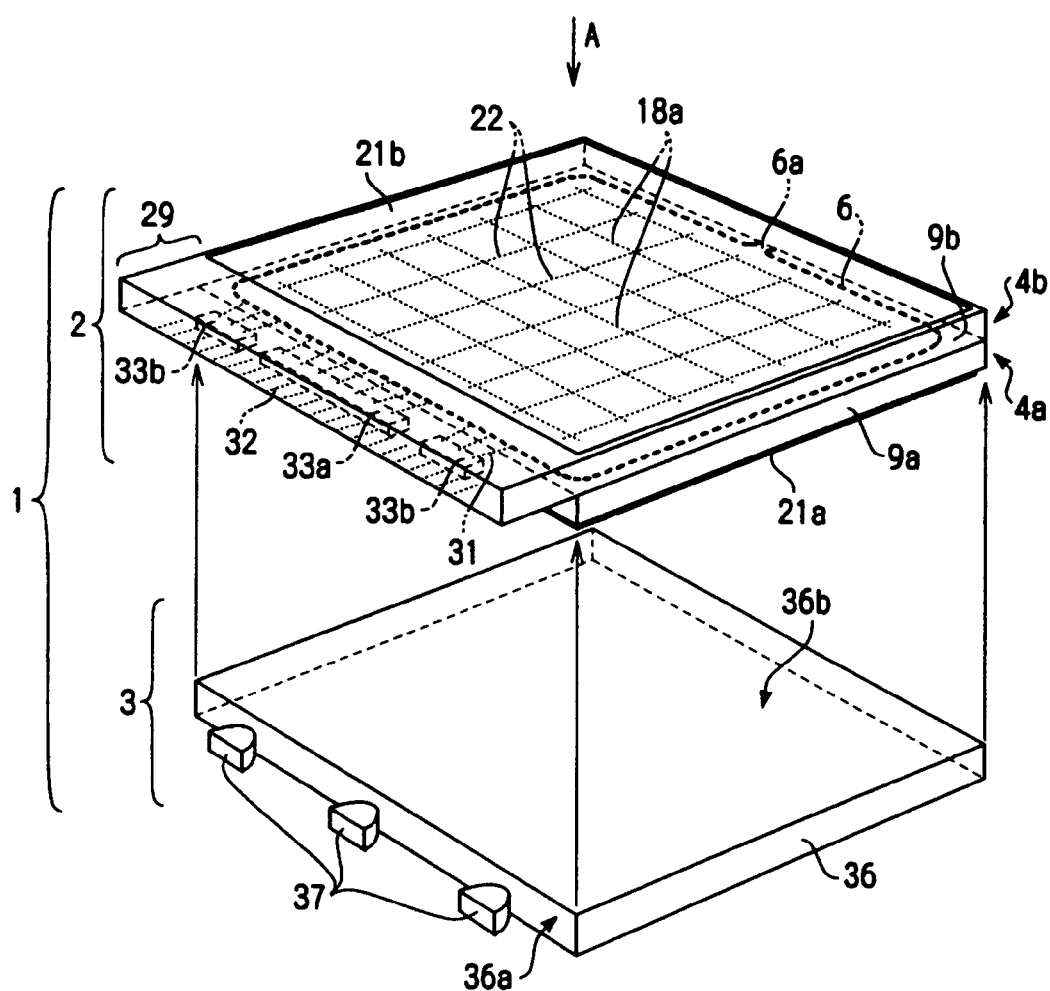
FIG. 4 is an oblique view of the liquid crystal display device, which is used as an embodiment of electro-optical apparatus in accordance with the embodiment of the present invention.
Figure 5:
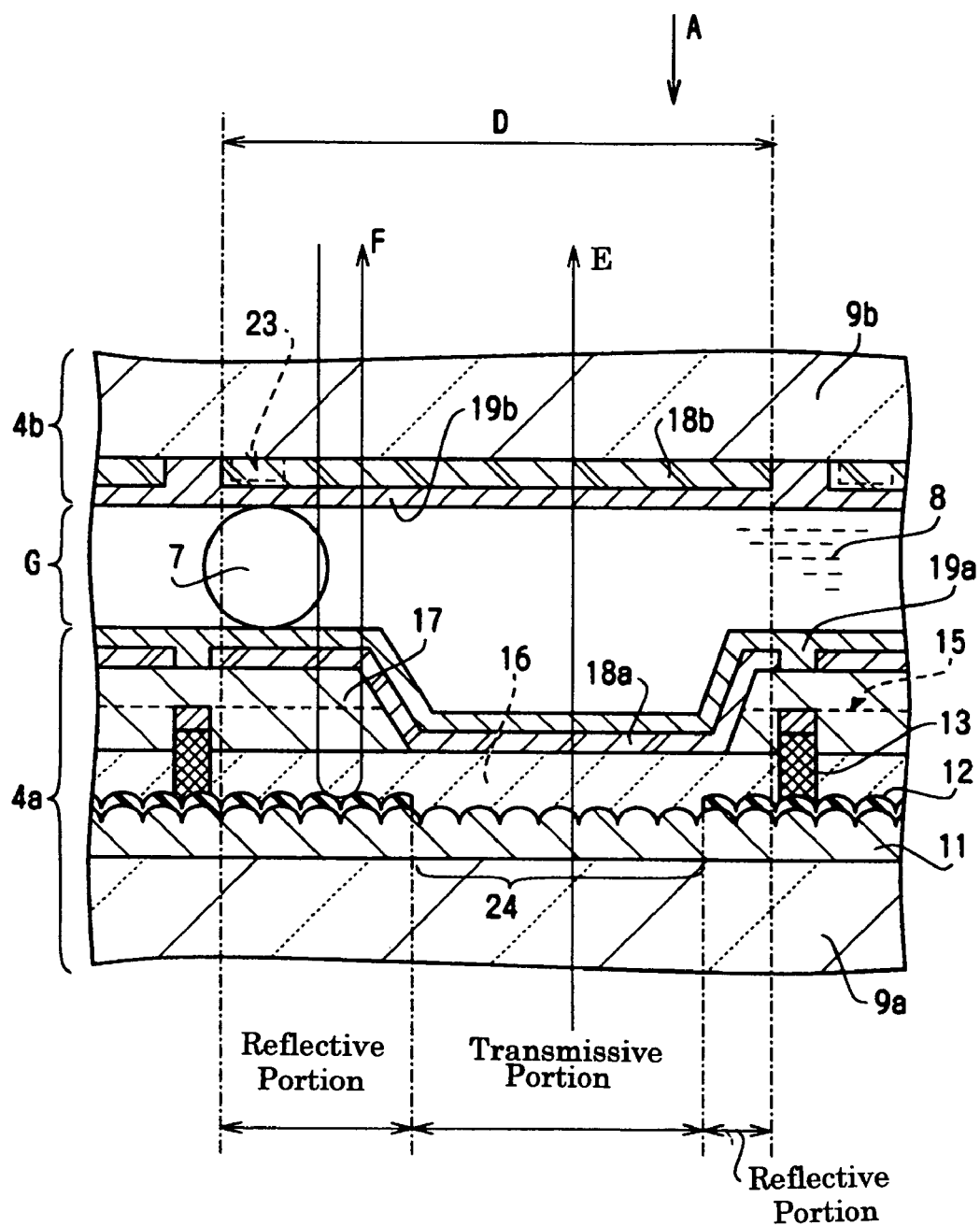
FIG. 5 is a magnified cross sectional view of one display dot region in the liquid crystal of FIG. 4 in accordance with the embodiment of the present invention.

Referring to FIG. 4, a liquid crystal device 1, which is an example of an electro-optical device, includes a liquid crystal panel 2 and an illuminating device 3. The liquid crystal panel 2 is formed by bonding a first substrate 4$a$ and a second substrate 4$b$ together with an annular sealing member 6. The first substrate 4$a$ is a color filter substrate whereon a color filter is to be formed. The second substrate 4$b$ is an element substrate whereon a TFD (Thin Film Detector) element is to be formed. FIG. 5 shows a magnified view of one of the display dot sections D in the liquid crystal panel 2 of FIG. 4. As shown in FIG. 5, a gap, a so-called cell gap G, is formed between the first substrate 4$a$ and the second substrate 4$b$ and maintained by a spacer 7. The liquid crystal fills the cell gap G to form a liquid crystal layer 8.

Figure 2:
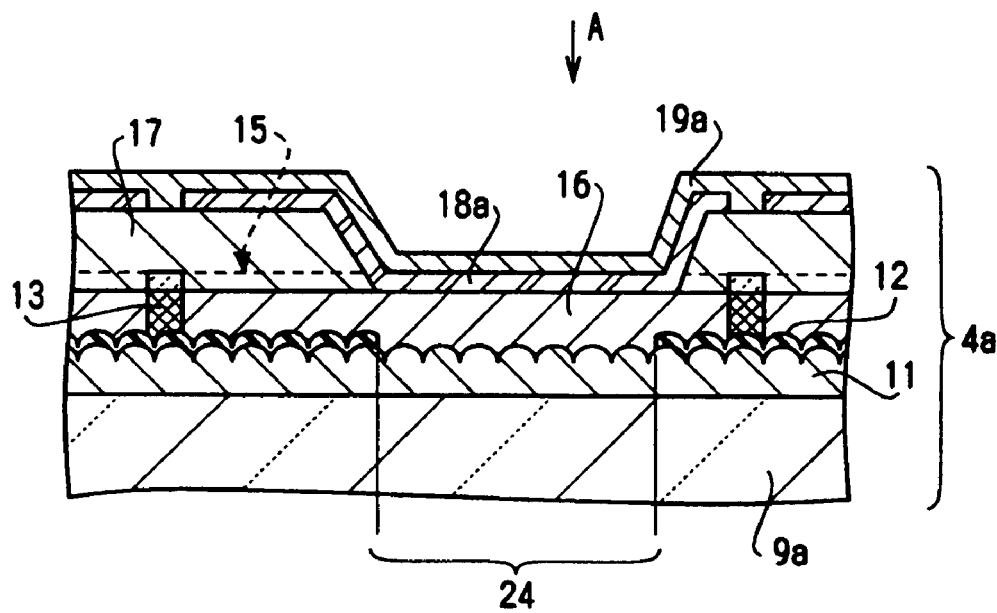
FIG. 2(*a*) is a cross sectional view of the color filter substrate in accordance with the embodiment of the present invention viewed along line IIa—IIa of FIG. 1.
Figure 2:
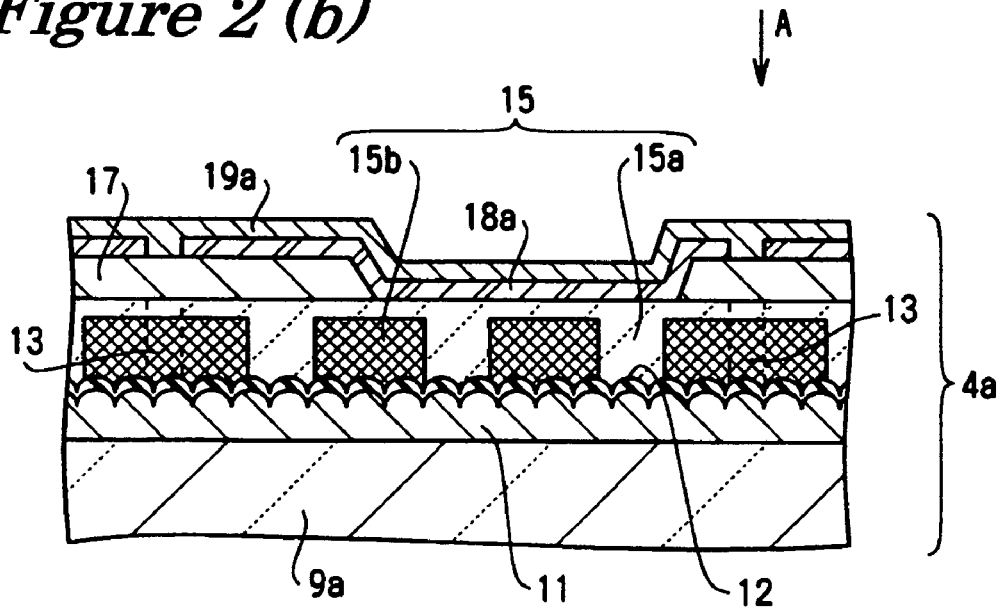

FIG. 1 shows a two-dimensional constitution of one pixel area of the first substrate 4$a$, as viewed from the direction of the arrow A in FIG. 4. This viewing direction is the same as the direction in which the viewer views the display. FIG. 2($a$) is a cross sectional view of the first substrate 4$a$ viewed along the line IIa—IIa shown in FIG. 1. FIG. 2($b$) is a cross sectional view of the first substrate 4$a$ viewed along the line IIb—IIb shown in FIG. 1. In FIG. 2($a$) and FIG. 2($b$), the first substrate 4$a$ includes a first base member (rear base) 9$a$ which is made of light transmissive glass, light transmissive plastic or any other light transmissive material. A resin layer 11 is formed on the liquid crystal side of the first base member 9$a$, over which is formed a reflective film 12.

In FIG. 2($b$), a bank 15 is disposed in the left to right direction as seen on the drawing, and light blocking members 13 are disposed in the up and down direction as seen on the drawing, both on the reflective film 12. The bank 15 includes a non-transmissive portion 15b and a transmissive portion 15a alternately disposed in the left to right direction as seen in FIG. 2(b). The non-transmissive portion 15b is formed with, for example, a black photosensitive resin, which is then given a photolithographic treatment. The transmissive portion 15a is produced using a transparent, ink repellant and photosensitive resin, which is then given a photolithographic treatment. Here the ink repellant property refers to a property of repelling the material for the coloring elements that is sprayed by an inkjet technique, which is to be further explained later.

The light blocking members 13 and the non-transmissive portions 15b are produced simultaneously with the same material and at the same manufacturing process. As shown in FIG. 2(b), the material for the transmissive portion 15a is stacked over the non-transmissive portion 15b and the light blocking members 13. The stacking of the material for the transmissive portion 15a, which has an ink repellant property, over the non-transmissive portions 15b and the light blocking members 13 renders the non-transmissive portions 15b and the light blocking members 13 to be ink repellant. Hereinafter, thin layers of the material for the transmissive portion 15a that are stacked over the light blocking members 13 and the non-transmissive portions 15b are included as part of the terms "light blocking member 13" and "non-transmissive portion 15b."

In FIG. 1, the light blocking members 13 are formed to extend in the up and down direction as viewed in FIG. 1. On the other hand, the bank 15 is formed to extend in the left to right direction as viewed in FIG. 1, that is, in a direction perpendicular to the direction in which the light blocking members 13 extend. The coloring elements are formed within regions framed by the bank 15 and the blight blocking members 13. The coloring elements 16 have three colors, namely R (red), G (green), and B (blue), one of which being formed in each region framed by the bank 15 and the light blocking members 13. The banks 15 are disposed on the left to right edges of the coloring element 16, while the light blocking members 13 are disposed on the top to bottom edges of the coloring element 16, as seen in FIG. 1. As shown further in FIG. 1, the coloring elements in the R, G and B colors are respectively called coloring elements 16r, 16g and 16b. In the present embodiment, the coloring elements 16 in the colors of R, G and B are arranged to form the stripe pattern as shown in FIG. 7(a).

Alternatively, the coloring elements may also be arranged in a pattern other than the stripe pattern, such as the mosaic pattern shown in FIG. 7(b) or the delta pattern shown in FIG. 7(c). The mosaic pattern is a pattern where the R, G and B colors are repeated in the same sequence in both longitudinal and lateral directions. The delta pattern is a pattern where the R. G and B colors are placed at vertices of a triangle pattern and the colors are repeated in the same sequence in the lateral direction.

In FIG. 2(a) and FIG. 2(b), an overcoat layer 17 is formed over the blocking members 13, the banks 15, and the coloring elements 16, strip-shaped transparent electrodes 18a are formed on the overcoat layer 17, and an orientation film 19a is formed further on the strip-shaped electrodes 18a. The orientation film 19a is subjected to orientation treatment such as rubbing treatment, whereby the orientation of the liquid crystal molecules near the orientation film 19a is set. Also, a polarizing plate 21a is mounted on the outside surface of the first base member 9a by bonding or the like, as shown in FIG. 4.

In FIG. 2(a) and FIG. 2(b), a rugged irregular surface is formed on the resin layer 11, and also on the reflective film 12 that is formed over the resin layer 11. The pattern of the ruggedness is random when viewed in the direction of arrow A. The presence of ruggedness causes scattering of light rays that are incident on the reflective film 12. The strip-shaped transparent electrodes 18a extend in a direction orthogonal to the paper plane of FIG. 2(a) and FIG. 2(b), such that the intervals between adjacent strip-shaped electrodes 18a are approximately equal to the width of the light blocking member 13. The intervals render the plurality of strip-shaped electrodes 18a appear to be in a stripe pattern, as seen from the direction of arrow A.

Figure 3:
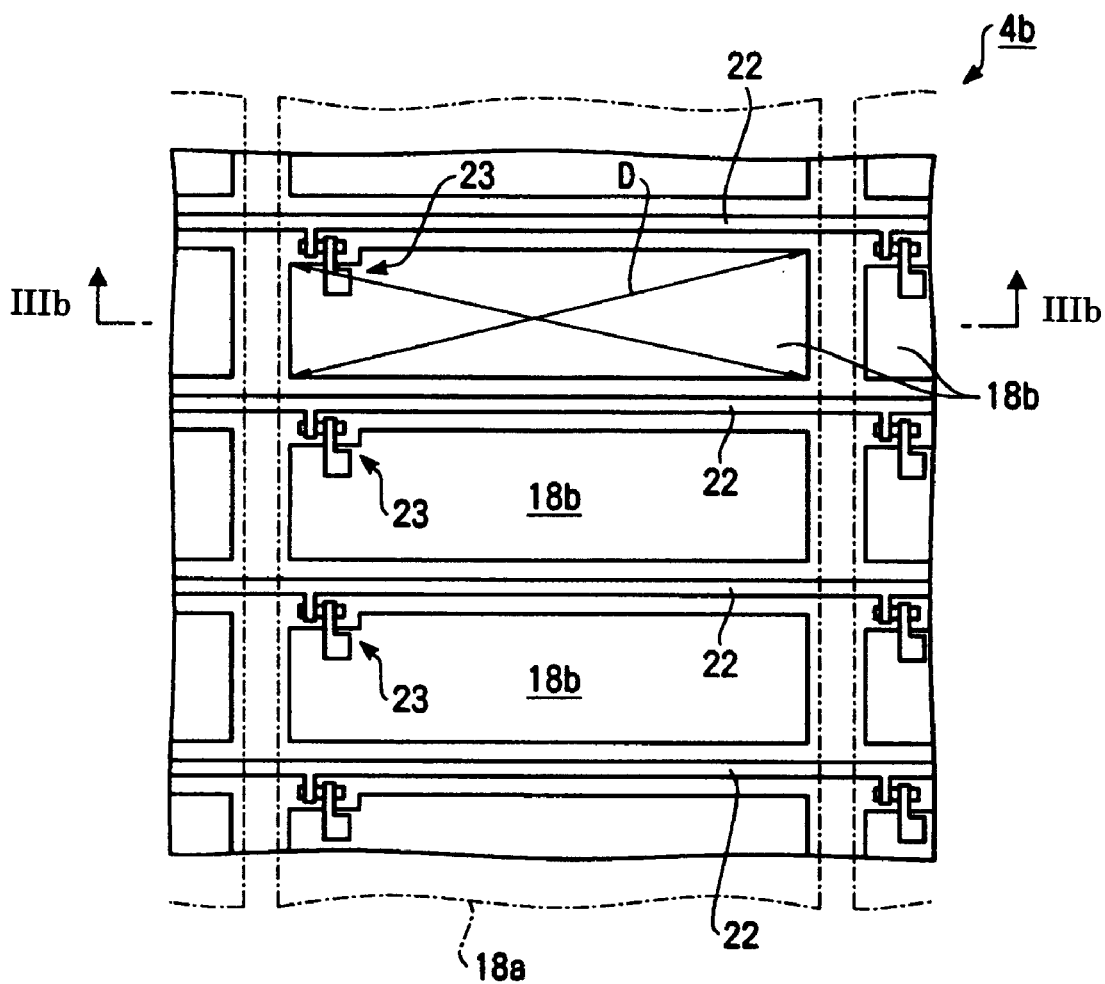
FIG. 3(*a*) is a plan view of one pixel portion on the element side substrate that is included in a liquid crystal apparatus, which is used an example of electro-optical apparatus in accordance with an embodiment of the present invention.
Figure 3:
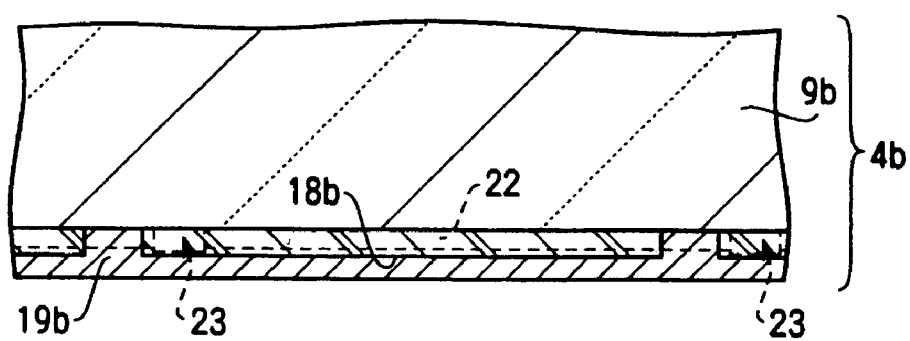

In FIG. 5, the first substrate 4a and the second substrate 4b face each other across the liquid crystal layer 8. FIG. 3(b) shows the cross sectional view of the second substrate 4b along line IIIb—IIIb shown in FIG. 3(a). In FIG. 3(b), the second substrate 4b includes a second base member (front base) 9b made of a light transmissive glass, plastic or another material. A line wiring 22 which has a linear form, TFD elements 23 which are active elements, and dot electrodes (pixel electrodes) 18b which are transparent, and orientation film 19b are all formed on a liquid crystal side surface of the second substrate 4b. The orientation film 19b is given an orientation-rendering treatment such as rubbing, for orienting the liquid crystal molecules near the orientation film 19b. The rubbing direction of the surface of the orientation film 19a that faces the first substrate 4a in FIG. 5 and that of the surface of the orientation film 19b that faces the second substrate 4b cross each other at an appropriate angle depending on the crystalline characteristics. In FIG. 4, the polarizing plate 21b is glued or otherwise attached to the outside surface of the second base member 9b.

In FIG. 3(a), the dot electrode 18b is formed as a substantially square or rectangular shaped dot, and is connected to the line wiring 22 through the TFD element 23. The strip-shaped electrode 18a, formed in a strip-like shape and disposed on the first substrate 4a side, is shown in FIG. 6(a) in broken lines for reference. The area where the dot electrode 18b and the strip-shaped electrode 18a appear to overlap each other in a plan view constitutes one display dot region D. One display dot region D corresponds to one of the three colors, R, G and B. In the present embodiment of color display, three display dot regions D, which correspond to the three colors, R, G and B, constitute one pixel. In FIG. 5, the reflective film 12 has an opening 24 for each displayer dot D for allowing light rays to pass through. Although the opening 24 is formed to pass light rays to the reflective film 12 in this embodiment, the reflective membrane 12 may be alternatively rendered thin, in lieu of forming the opening 24, so as to have the ability of both reflecting light and transmitting light.

Figure 6:
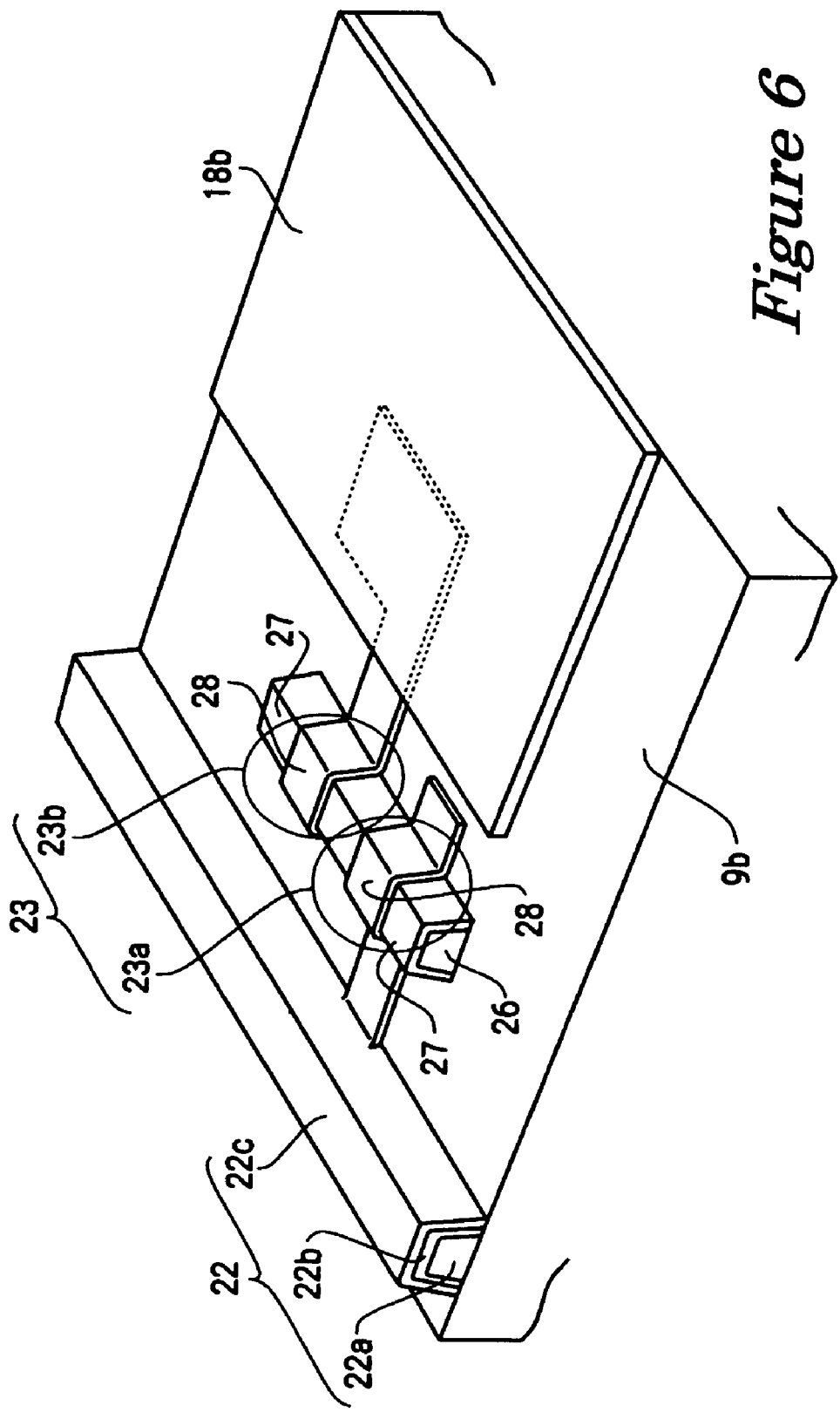
FIG. 6 is an oblique view of one of the switching elements used in the liquid crystal apparatus of FIG. 4.

The TFD element 23 shown in FIG. 3(a) is formed by connecting a first TFD element 23 and a second TFD element 23b in series, as shown in FIG. 6. The TFD element 23 is formed, for instance, in the following manner. Firstly, a first layer 22a of the line wiring 22 and a first metal 26 of the TFD element 23 are formed with TaW (tantalum tungsten). Secondly, a second layer 22b of the line wiring 22 and an insulation membrane 27 of the TFD element 23 are formed by an anodizing process. Thirdly, a third layer 22c of the line wiring 22 and a second metal 28 of the TFD element 23 are formed with Cr (chrome), for example.

The second metal 28 of the first TFD member 23a extends out of the third layer 22c of the line wiring 22. The dot electrode 18b is formed so as to overlap with the tip of the second metal 28 of the second TFD member 23b. If an electric signal is to flow from the line wiring 22 in the direction toward the dot electrode 18b, the electric signal would flow through the first TFD member 23a, from the second metal 28 to the insulation film 27 and thence to the first metal 26. On the other hand, in the second TFD member 23b, the electric signal would flow from the first metal 26 to the insulation membrane 27, then to the second metal 28.

In other words, a pair of electrically opposed TFD members are connected in series between the first TFD member 23a and the second TFD member 23b. It is known that a TFD element in such a construction, commonly called a back-to-back construction, offers more stable characteristics than a TFD element constituted with only one TFD member.

In FIG. 4, the second substrate 4b includes an overhang portion 29 that projects beyond the first substrate 4a. A wiring 31 and a terminal 32 are formed on a surface of the overhang portion 29 that faces the first substrate 4a. One driver IC 33a and two driver ICs 33b are installed through an ACF (anisotropic conductive film), which is not illustrated, in a region where the wiring 31 and the terminals 32 are gathered.

The wiring 31 and the terminals 32 are formed on the second substrate 4b concurrently when the line wiring 22 and the dot electrodes 18b are formed. The line wiring 22 extends onto the overhang portion 29, becomes a wiring 31 thereon, and becomes connected to the driver IC 33a. There are spherical or cylindrical conducting members (not illustrated in Figures) that are mixed into the sealing member 6, which glues the first substrate 4a and the second substrate 4b together. The strip-shaped electrodes 18a, which are formed over the first substrate 4a, extend over the first substrate 4a up to the location of the sealing member 6, and thereupon are connected through the conductive members to the wiring 31 on the second substrate 4b. The strip-shaped electrodes 18a, which are on the first substrate 4a, are thus connected to the driver IC 33b, which is on the second substrate 4b.

In FIG. 4, an illumination device 3 is disposed facing the outside surface of the first substrate 4a, which is a component of the liquid crystal panel 2. The illumination device 3 includes a light guide 36, which is a square plate and is made of transparent plastic, for example; and LEDs 37, which are point sources of light. A light reflective sheet (not illustrated in the Figures) may be additionally installed on the surface of light guide 36, which is on an opposite side from the liquid crystal panel 2. A light diffusing sheet (not illustrated in the Figures) may also be installed on the surface of light guide 36, which is facing the liquid crystal panel 2. Additionally, a prism sheet (not illustrated in the Figures) may also be installed over the light diffusing sheet. Although three LEDs 37 are used in the present embodiment, only one, two or more than three LEDs 37 may also be used. A line light source such as a cold cathode tube, or other point light sources can also be used in lieu of the LED.

An explanation follows with regard to a liquid crystal device constituted as described in the foregoing.

If external light of sufficient brightness is available, external light such as sunlight or room light is taken inside the liquid crystal panel 2 through the second substrate 4b, as shown by an arrow F in FIG. 5. This external light F, after passing through the liquid crystal layer 8, is reflected by the reflective film 12 and supplied to the liquid crystal layer 8. If, on the other hand, the external light is insufficient, the LEDs 37 of the illuminating device 3 shown in FIG. 4 are lit. Here, the light from the LEDs 37, which are a point-source light, is directed inside the light guide 36 through a light entrance surface 36a of the light guide 36, and thereafter emitted as a surface light from the surface that faces the liquid crystal panel 2, which is a light emitting surface 36b. As shown by an arrow E in FIG. 5, light from the entire light emitting surface 36b is supplied, now as a surface-source light as opposed to point-source light, to the liquid crystal layer 8, through the openings 24, which are formed in the light reflective film 12.

While light is being supplied to the liquid crystal layer 8 in the foregoing manner, the driver ICs 33a and 33b in FIG. 4 control the liquid crystal panel 2. A scanning signal, for instance, is supplied to the line wiring 22 while a data signal, for instance, is supplied to the strip-shaped electrode 18a concurrently. Here, if the TFD element 23 (see FIG. 3(a)) associated with a particular display dot assumes the selected status (that is, the "on" state) in response to a voltage differential between the scanning signal and the data signal, an image signal is written to the liquid crystal capacitance within that display dot. Thereafter, if the particular TFD element 23 assumes the unselected status (that is, the "off" state), that image signal is stored in the display dot and drives the liquid crystal layer 8 within the display dot.

As seen, the liquid crystal molecules of the liquid crystal layer 8 are controlled for each display dot D. That is, light passing through liquid crystal layer 8 of each display dot D is modulated. As the light so modulated passes through polarizing plate 21b which is located on the second substrate 4b side in FIG. 4, characters, numbers, patterns and other images are displayed in the effective display region of the liquid crystal panel 2. A display that uses the external light reflected off the reflective film 12 shown in FIG. 5 is the display in the reflective display mode. A display that uses the light from the illuminating device 3 is the display in the transmissive display mode. In the present embodiment, the reflective display mode and the transmissive display mode may be used as desired by the user or as automatically selected to suit the ambient environment.

In the present embodiment, as shown in FIG. 1, the bank 15 is disposed at the boundaries of the plurality of coloring elements 16r, 16g and 16b. The transmissive portions 15a are disposed within the bank 15. The reflective film 12, shown in FIG. 2(a) and FIG. 2(b), is exposed externally at the transmissive portions 15a. External light rays that are incident on the liquid crystal panel 2 becomes a reflected light of the color corresponding to the color of the coloring element 16 in a region where there is a coloring element 16. However, the external incident light rays, if reflected by the reflective membrane 12 at the transmissive portion 15a of the bank 15, become uncolored, bright reflected light rays. As seen, since uncolored bright light rays can be obtained at the transmissive portion 15a, it is possible to provide a bright color display in the reflective display mode.

In a conventional liquid crystal display device, a light blocking member, which is equivalent to the light blocking member 13, is disposed over the entire region where the bank 15 of the present embodiment would be located, such that the light blocking member functions as a black mask. In the structures of Japanese Patent Application Publication No. 10-186347 and Japanese Patent Application No. 2002-230291, an uncolored reflective region, in other words an exposed region of a reflective film, is formed separately from and framed by the black mask, such that the brightness in the reflective display mode is improved. By contrast, in the present embodiment, the transmissive portion 15a is formed in the bank 15 itself. Consequently, the liquid crystal of the present embodiment offers sufficient color saturation while providing a bright reflected light at the same time.

Additionally, it is desirable to vary the areas of the exposed transparent region for each of the R, G and B coloring elements 16. Such transparent regions are determined for each coloring element 16 to balance the R, G and B colors appropriately. For example, if the area of a display dot is 15123 µm², the required area Ar for the R coloring element 16r is set as Ar=681 µm², the required area Ag for the G coloring element 16g is set as Ag=2003 µm², and the required area Ab for the B coloring element 16b is set as Ab=1014 µm². However, as seen in FIG. 1, the width of the bank 15 is constant regardless of the color of the coloring elements 16 that are adjacent to the bank 15.

Since in the current embodiment, the required area of the exposed region of the reflective film, or the transparent region, is different for R, G and B colors, the areas of the transmissive portions 15a of the bank 15 are set differently depending on the color of the coloring element 16 that is adjacent to the bank 15. To reiterate, where the area of the transmissive portion 15a at the boundary between an R coloring element 16r and a B coloring element 16b is Arg, the area of the transmissive portion 15a between a G coloring element 16g and a B coloring element 16b is Agb, and the area of the transmissive portion 15a between a B coloring element316b and an R coloring element 16r is Abr, the following relationship preferably stands:

$$Arg \neq Agb \neq Abr$$

More specifically, the required areas Ar, Ag and Ab of the exposed parts of the R, G and B and the areas of the transparent banks Arg, Agb, and Abr satisfy the followings:

$$Arg=Ar/2+Ag/2$$

$$Agb=Ag/2+Ab/2$$

$$Abr=Ab/2+Ar/2$$

In other words, the amount of the exposed area that one coloring element is required to have is provided by two transmissive portions that are adjacent to the coloring element. More specifically, half of the required area for one coloring element is provided by one adjacent transmissive portion, the other half is provided by another adjacent transmissive portion.

As evident from FIG. 1 and FIG. 3(a), when the liquid crystal panel 2 (see FIG. 4) is formed by combining the first substrate 4a and the second substrate 4b, the line wiring 22, which is on the second substrate 4b, partially overlaps with the transmissive portion 15a of the bank 15, which is on the first substrate 4a, when viewed from the direction of arrow A in FIG. 4. Here, the line wiring 22 functions as a black mask, which blocks light from reaching the viewer. In consideration of the foregoing fact, it is desirable to form the width of the bank 15 thicker than the width of the line wiring 22, more specifically the area of the transmissive portion 15a of the bank 15 greater than the area of the line wiring 22. Moreover, if the area of the line wiring 22 is represented by $A_L$, the areas Arg, Agb, Abr of the transmissive portion 15a which is disposed between adjacent pairs of coloring elements 16r, 16g and 16b can be respectively described as:

$$Arg=Ar/2+Ag/2+A_L$$

$$Agb=Ag/2+Ab/2+A_L$$

$$Abr=Ab/2+Ar/2+A_L$$

With the above arrangement, it is possible to secure for each of the three colors sufficient area of exposed region of the reflective film outside the region in which the line wiring 22 that functions as a black mask is disposed. Accordingly, it is possible to provide desired level of brightness in the reflective display mode.

Although the transmissive portions 15a are formed inside the bank 15 in the present embodiment, it is alternatively possible to form the bank 15 totally from a transparent material, instead of partially forming the transmissive portions 15a in the bank 15. To reiterate, a bank 15 may be configured without a non-transmissive portion 15b disposed therein. Such a configuration can also offer a bright display in the reflective display mode as in the case of the present embodiment.

However, in such a configuration, if the areas of the exposed portion of the reflective portion required by the coloring elements 16r, 16g and 16b are small, the width of the bank 15 may possibly become narrow. If the width of the bank 15 is excessively narrow, it may possibly cause the different colors to be mixed between adjacent coloring elements 16 of different colors. Such a narrow bank 15 may also lack sufficient mechanical strength.

In the present embodiment, since the bank 15 has the transmissive portions 15a and the non-transmissive portions 15b, as opposed t the bank 15 being formed of a transparent material in its entirety, the width of the bank 15 may be made wide even when the required total area of transmissive portions 15a happens to be small. Since the width of the bank 15 is sufficiently wide, it is possible to secure sufficient mechanical strength and sufficiently strong ink repellency of the bank 15.

In the present embodiment, the width W of a plurality of banks 15 in FIG. 1 is set at a constant dimension, for example, within a range of W=10 µm to 18 µm, regardless of the colors of the coloring elements 16 between which the bank 15 is disposed. However, the width of bank 15 may vary as required depending on the colors of the coloring elements 16 between which the bank 15 is disposed.

MODIFICATION OF COLOR SUBSTRATE 4A

Figure 8:
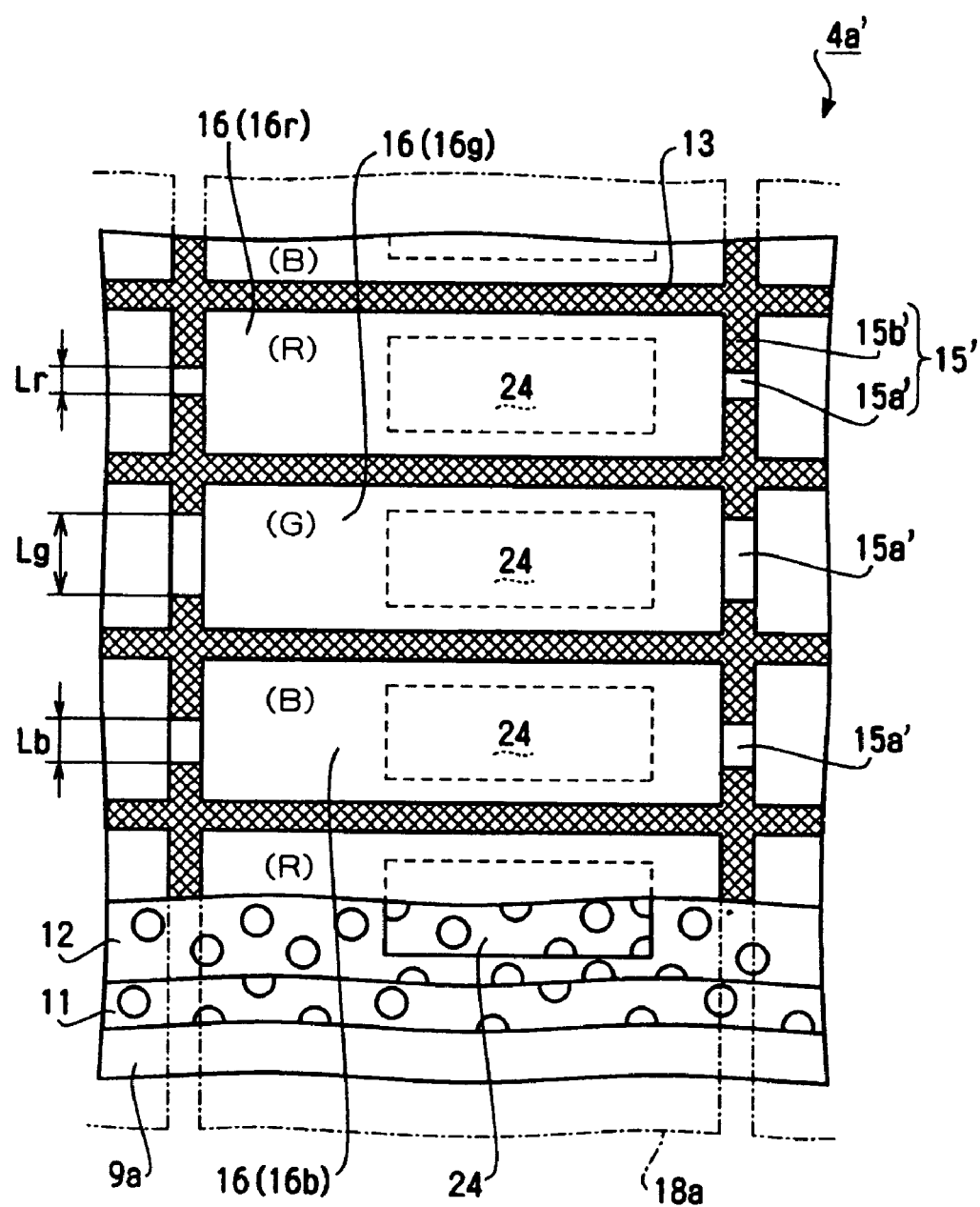
FIG. 8 is a plan view of one pixel portion of a color filter substrate in accordance with another embodiment of the present invention.

In the embodiment shown in FIG. 1, the transmissive portions 15a are formed along the horizontal edges, that is, along the longer edges of the coloring elements 16. As shown in FIG. 8, however, the transmissive portions 15a' may be formed along the vertical edges, that is, along the shorter edges of the coloring elements 16. In such a case, the length of the transmissive portion 15a is determined in accordance with the color of the adjacent coloring elements 16. More specifically, the lengths Lr, Lg and Lb of the transmissive portions 15a' relate to the areas of the uncolored reflective region, in other words the areas of the exposed portion of the reflective film, that are required by the corresponding coloring elements 16r, 16g and 16b. Furthermore, the transmissive portions 15a' may be formed along both longitudinal and lateral edges, as required.

In the foregoing embodiment, the present invention was applied to semi-transmissive-reflective liquid crystal displaying devices of active matrix type using TFD elements, which are 2-terminal type switching elements. The present invention is, however, also applicable to liquid crystal displaying devices of active matrix type using TFT (thin film transistor), which are 3-terminal type switching elements. The present invention is likewise applicable to simple matrix type liquid crystal devices that use no switching elements. The present invention is further applicable to reflective type liquid crystal devices. The present invention is still further applicable to non-liquid crystal type electro-optical devices such as organic EL devices, plasma display devices, and many others.

METHOD OF MANUFACTURING COLOR FILTER SUBSTRATE 4A

The method for manufacturing a color filter substrate in accordance with the present invention will now be described using a case of manufacturing the color filter substrate 4a shown in FIGS. 1 and 2 as an example.

Figure 9:
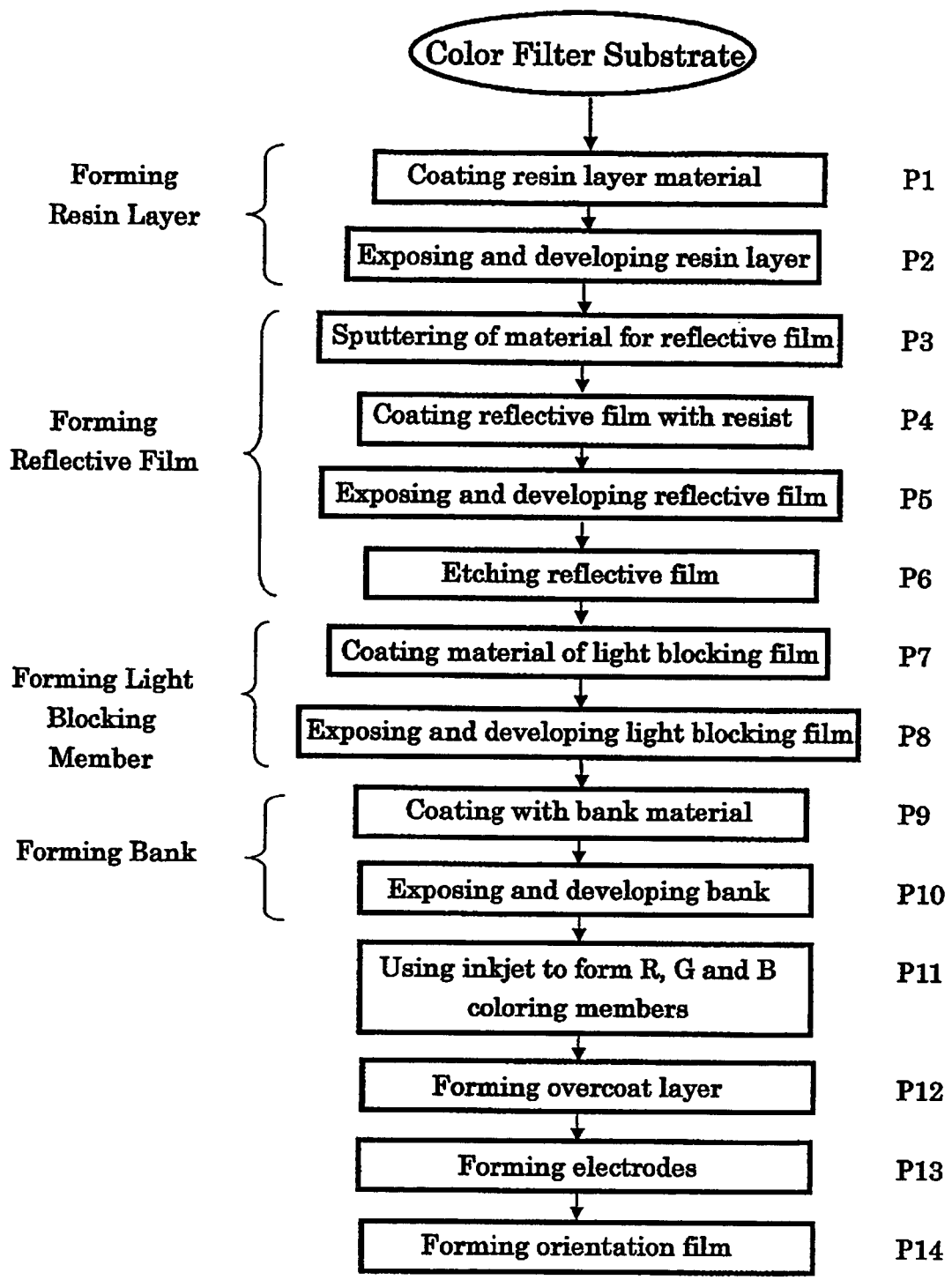
FIG. 9 is a process flow chart showing method of manufacturing the color filter substrates in accordance with an embodiment of the present invention.

FIG. 9 shows a method of manufacturing a color filter substrate according to one embodiment of the present invention. In process P1, the material for the resin layer 11 shown in FIG. 2, which is a photosensitive resin in the present embodiment, is evenly applied over the first base member 9a. Next, in process P2, the layer of the resin layer material is exposed and developed to form the resin layer 11. Concurrently, a randomly rugged pattern is formed over the surface of resin layer 11. In this manner, a resin layer 11 having a random irregular surface is formed on the first base member 9a.

Next, in process P3, the material for the reflective layer 12 shown in FIG. 2, for example Cr, is applied over the resin layer 11 evenly by a sputtering process. In process P4, a resist material is applied evenly over the material layer of the reflective film 12 which has just been formed, and the layer of the resist material is exposed and developed to form a resist film of a desired pattern.

In process P5 that follows, the material layer for the reflective film 12 is exposed to light and developed, while the foregoing resultant resist film functions as a mask. In process P6, the surface is etched to form the reflective layer 12 over the resin layer 11. An opening 24 is also formed in this process in each displayer dot D. In this manner, the reflective film 12 is now formed with the opening 24 disposed in each displayer dot D.

In process P7, the reflective film 12 is coated evenly with a material for light blocking film 13, which is a black or other colored photosensitive resin.

Next, in process P8, the photosensitive resin is exposed and developed to produce a stripe-like colored blocking materials 13 and non-transmissive portions 15b. The non-transmissive portions 15b extend in a direction perpendicular to the light blocking members 13. The non-transmissive portions 15b are formed intermittently, that is, in a comb tooth pattern.

In process P9, the reflective film 12 is coated evenly with a material for the transmissive portions 15a, such as a transparent photosensitive resin. Next, in process P10, the transparent photosensitive resin is exposed and developed to form the transmissive portions 15a, such that the transmissive portions 15a fill in the spaces between the non-transmissive portions 15b. The material for the transmissive portion 15a, which is an ink repellant material, is also applied over the non-transmissive portions 15b and over the light blocking members 13. Here, the term "transmissive" as used in the transmissive to portion 15a means having a higher light transmissivity than the coloring elements 16, with preferably a light transmissivity of 50% or greater, and more preferably 80% or greater, against light rays having a wavelength of between 400 nm and 700 nm. In consideration for an inkjet process which follows, it is desirable to form the bank 15 with an ink repellant material such as a fluoric material.

The total areas Arg, Agb and Abr of the transmissive portions 15a within each bank 15 are set at different values, depending on the colors of the adjacent coloring elements 16. The specific method by which the areas are determined is omitted herein as it is the same as that described in the embodiment of the color filter substrate.

In this manner, a plurality of square regions that are framed by the light blocking members 13 and the banks 15 are formed on the first base member 9a as shown in FIG. 1, so as to form a dot matrix. Here, portions of the reflective film 12 that are underneath the light blocking members 13 and the non-transmissive portions 15b are invisible.

On the other hand, portions of the reflective film 12 are externally exposed, that is, in a transparent condition, where the transmissive portions 15a of the bank 15 are disposed. The area of the transmissive portion 15a is determined in terms of the required area of the exposed portion of the reflective film 12 based on the adjacent coloring elements 16. The area of a line wiring 22 that is on the opposite second substrate 4b is also taken into consideration in determining the area of transmissive portion 15a.

Figure 10:
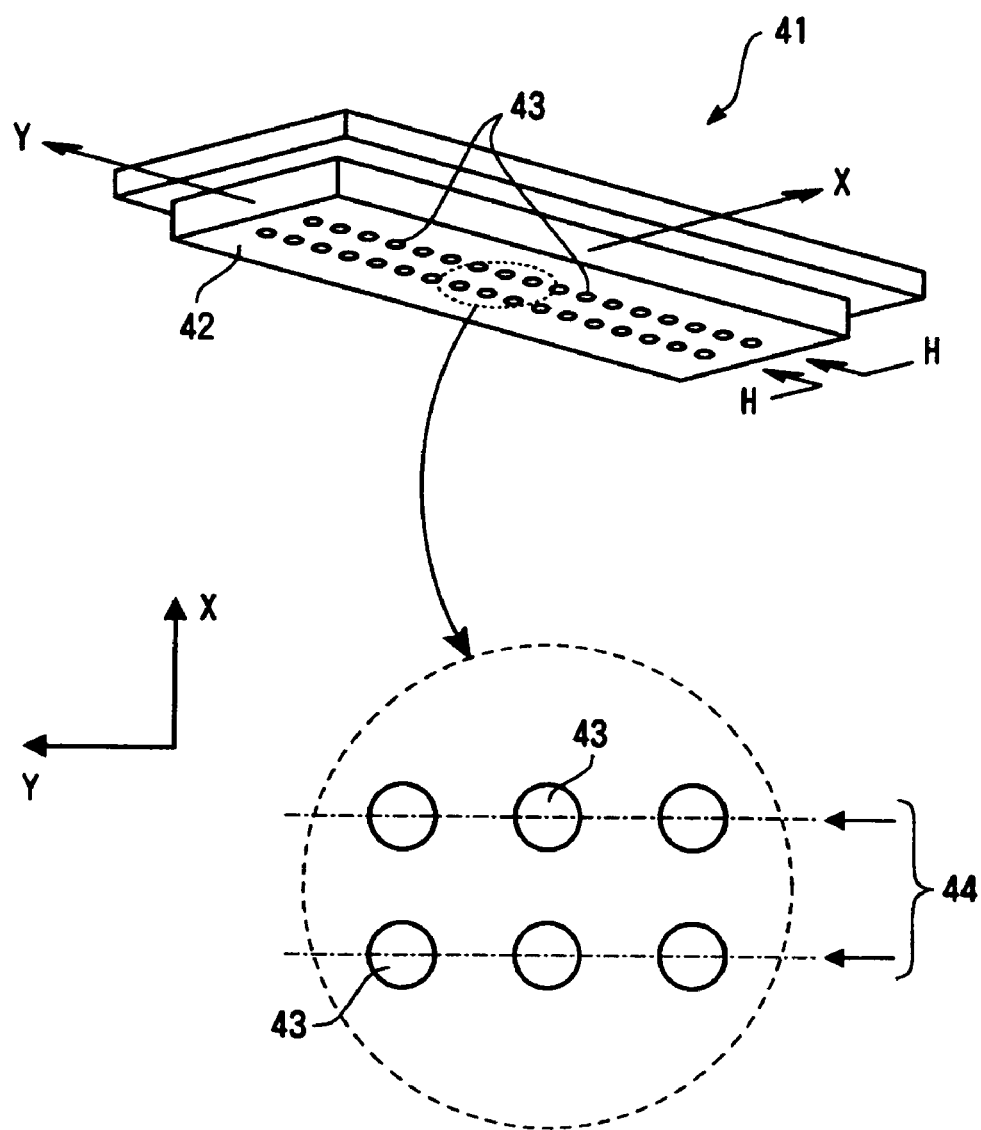
FIG. 10 is an oblique view of an inkjet head used in the manufacturing method shown in FIG. 9.

Then, in the subsequent process P11 shown in FIG. 9, the material for the coloring elements 16 is disposed by droplet discharge or ink jetting, in the dot regions that are framed by the light blocking members 13 and the banks 15. The reflective film 12 is formed in accordance with an inkjet technology by scanning/moving the inkjet head 41 shown in FIG. 10 in a planar fashion as shown by arrows X and Y, for example. The inkjet head 41 has a substantially rectangular casing 42, and a plurality of nozzles 43 is provided to the bottom of the casing 42. The nozzles 43 have a small opening with a diameter of about 0.02 to 0.1 mm.

In the present embodiment, the plurality of nozzles 43 is provided in two rows, and two nozzle rows 44, 44 are formed in the head 41. In each nozzle row 44, the nozzles 43 are provided in a straight line at predetermined intervals. Liquid material is supplied to these nozzle rows 44 from directions shown by arrows H. The liquid material thus supplied is discharged as tiny droplets from the nozzles 43 in accordance with the vibration of the piezoelectric element 58. Although there are two nozzle rows 44 in this embodiment, the number of nozzle rows 44 may also be one or three or more. If there are more than three nozzle rows 44, materials for the coloring elements 16 of different colors R, G, B can be assigned to different nozzle rows 44, such that the nozzle rows 44 of one ink jet head 41 can deposit the materials for the coloring elements 16 of all colors.

Figure 11:
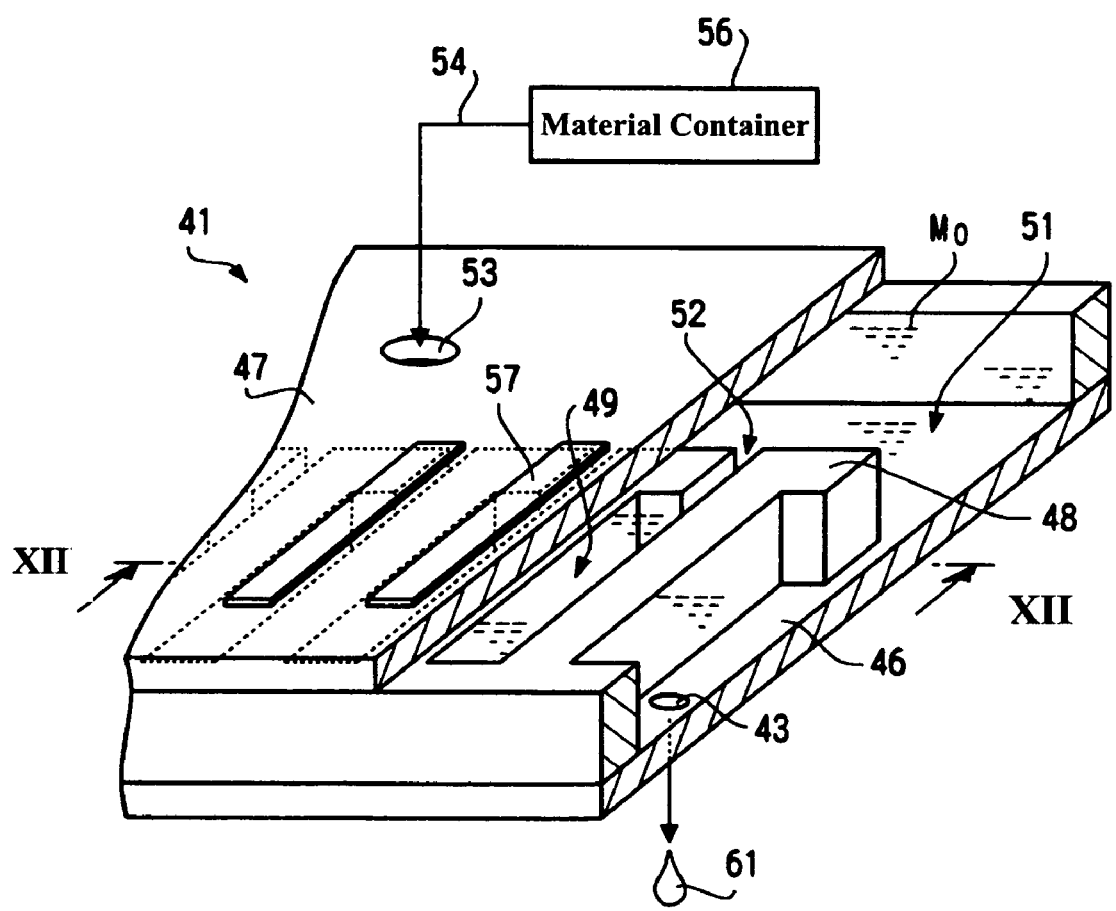
FIG. 11 is a partial oblique view of the internal construction of the inkjet head of FIG. 10.

The inkjet head 41 has, for example, a stainless nozzle plate 46, a vibrating plate 47 disposed facing the nozzle plate 46, and a plurality of partitioning members 48 for bonding together the nozzle plate 46 and the vibrating plate 47, as shown in FIG. 11. Also, a plurality of storage chambers 49 for storing the liquid material, and a liquid collector 51 disposed at a location in which the liquid material temporarily collects, are defined by the partitioning members 48 between the nozzle plate 46 and the vibrating plate 47. Furthermore, each of the plurality of storage chambers 49 and the liquid collector 51 are communicated via a channel 52. Also, a feed port 53 for supplying the liquid material is formed at an appropriate location in the vibrating plate 47, and a material container 56 is connected to the feed port 53 via a tube 54. Material for a coloring element is stored in the container 56, and liquid material M0 supplied from the container 56 is filled into the liquid collector 51 and then filled into the storage chambers 49 via the channel 52.

The nozzle plate 46, which is a part of the inkjet head 41, is provided with nozzles 43 for spraying liquid material in jet style from the storage chambers 49. A plurality of these nozzles 43 is aligned to constitute nozzle rows 44 as previously described with respect to FIG. 10.

Figure 12:
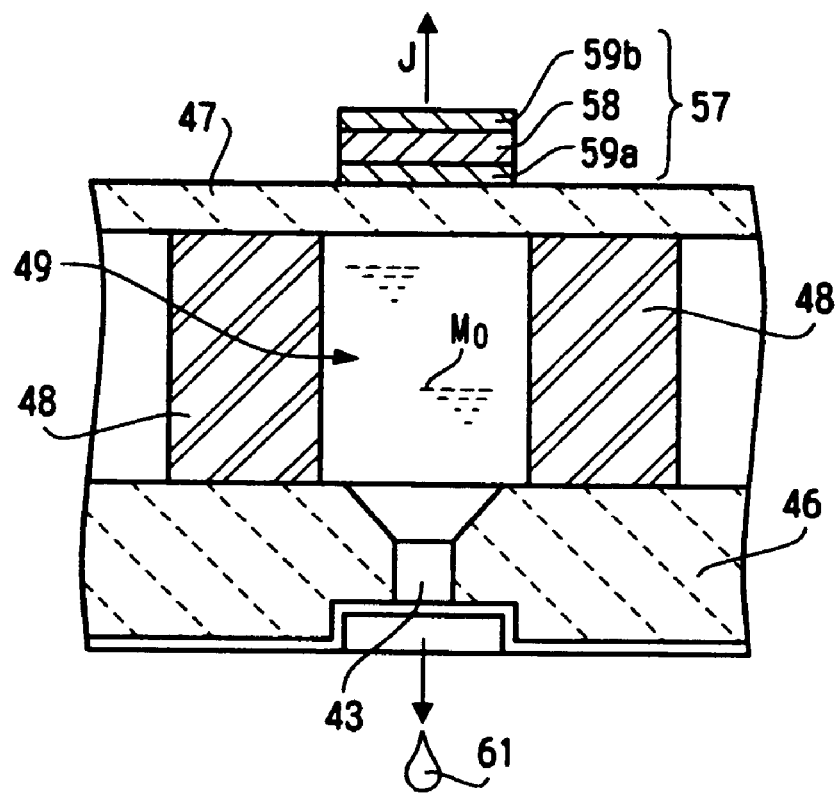
FIG. 12 is a cross sectional view of the ink jet head viewed along line XII—XII in FIG. 11.

Also, the vibrating plate 47 is provided with a pressure element 57 so as to correspond to the storage chambers 49 for applying pressure to the liquid material. This pressure element 57 has a piezoelectric element 58 and a pair of electrodes 59a and 59b on both sides of the piezoelectric element 58, as shown in FIG. 12.

Upon passing the electricity between the electrodes 59a and 59b, the piezoelement 58 distortedly deforms to project outward in the direction of arrow J, thereby increasing the volume of the storage chamber 49. Accordingly, the liquid material M0 flows from the liquid reservoir 51 to the storage chamber 49 via the passage 52 by a volume equivalent to the increase in the volume of the storage chamber 49.

When the passing of the electricity to the piezoelement 58 is stopped, the piezoelement 58 and the vibrating plate 47 return to the original state, and the volume of the storage chamber 49 also returns to the original volume. As a result, the pressure on the liquid material within the storage chamber 49 increases, jetting the liquid material out of the nozzle 43 as droplets 61. The droplets 61 are jetted out stably as minute droplets regardless of the kind of solvent or other ingredients that might be included in the liquid material.

In this case, dedicated inkjet heads 41 are provided for each of the coloring elements 16 of the three colors R, G, and B; and the heads 41 are installed in different stages in the production line. Coloring elements 16 of each color are then separately formed with the inkjet heads 41 for each color. Depending on the situation, it is also possible to incorporate a supply system for coloring element material of all three colors into one inkjet head 41, and to discharge the coloring elements 16 of the three colors solely with the single inkjet head 41.

By forming the coloring elements 16 with the ink jetting technology that uses the aforementioned inkjet head system, it is possible to reduce the consumption of coloring element material greatly, as compared to a case where the coloring elements are formed with a conventional patterning technology that uses photolithography. The production process is also significantly simplified.

After the coloring elements 16 are formed by ink jetting, an overcoat layer 17 as shown in FIG. 2 is formed in the subsequent step P12 shown in FIG. 9. Furthermore, strip-shaped electrodes 18a are formed in step P13 as shown in FIG. 2 by photolithography and etching, from ITO (indium tin oxide) or another such transparent conductive material. Furthermore, an orientation film 19a is formed in step P14 from polyimide or the like. A color filter substrate 4a is thereby manufactured as described above.

In the method of manufacturing the color filter substrate for the present embodiment, by using the inkjet head technique, the manufacture of the color filter substrate shown in FIG. 1 and FIG. 2, can be simplified and economized significantly. Also, since the transmissive portions 15a are disposed in the bank 15 itself, bright reflective light rays are available for displaying bright colors in the reflective display mode, while securing a large area for the coloring elements 16 to maintain well saturated colors.

MODIFICATION OF METHOD OF MANUFACTURING COLOR FILTER SUBSTRATE 4A

In the present embodiment, the invention was applied to manufacturing methods of a semi-transmissive-reflective liquid crystal displaying device of active matrix type that uses TFD elements, which are 2-terminal type switching elements. The invention, however, is also applicable to manufacturing methods of a liquid crystal displaying device of active matrix type that uses TFT elements (thin film transistor), which are 3-terminal type switching elements. The invention is likewise applicable to manufacturing methods of a simple matrix type liquid crystal device that uses no switching elements. The invention is also applicable to manufacturing methods of a reflective type liquid crystal device. The invention is further applicable to manufacturing methods of a non-liquid crystal type electro-optical device such as organic EL device, plasma display device, electron emission elements (such as Field Emission Display and Surface Conduction Electron emitter Display), and many others.

ELECTRONIC EQUIPMENT

An explanation of an electronic equipment in accordance with a fifth embodiment of the present invention will follow. This embodiment shows only an example of this invention. Therefore, the scope of the present invention is not limited to this particular embodiment.

Figure 13:
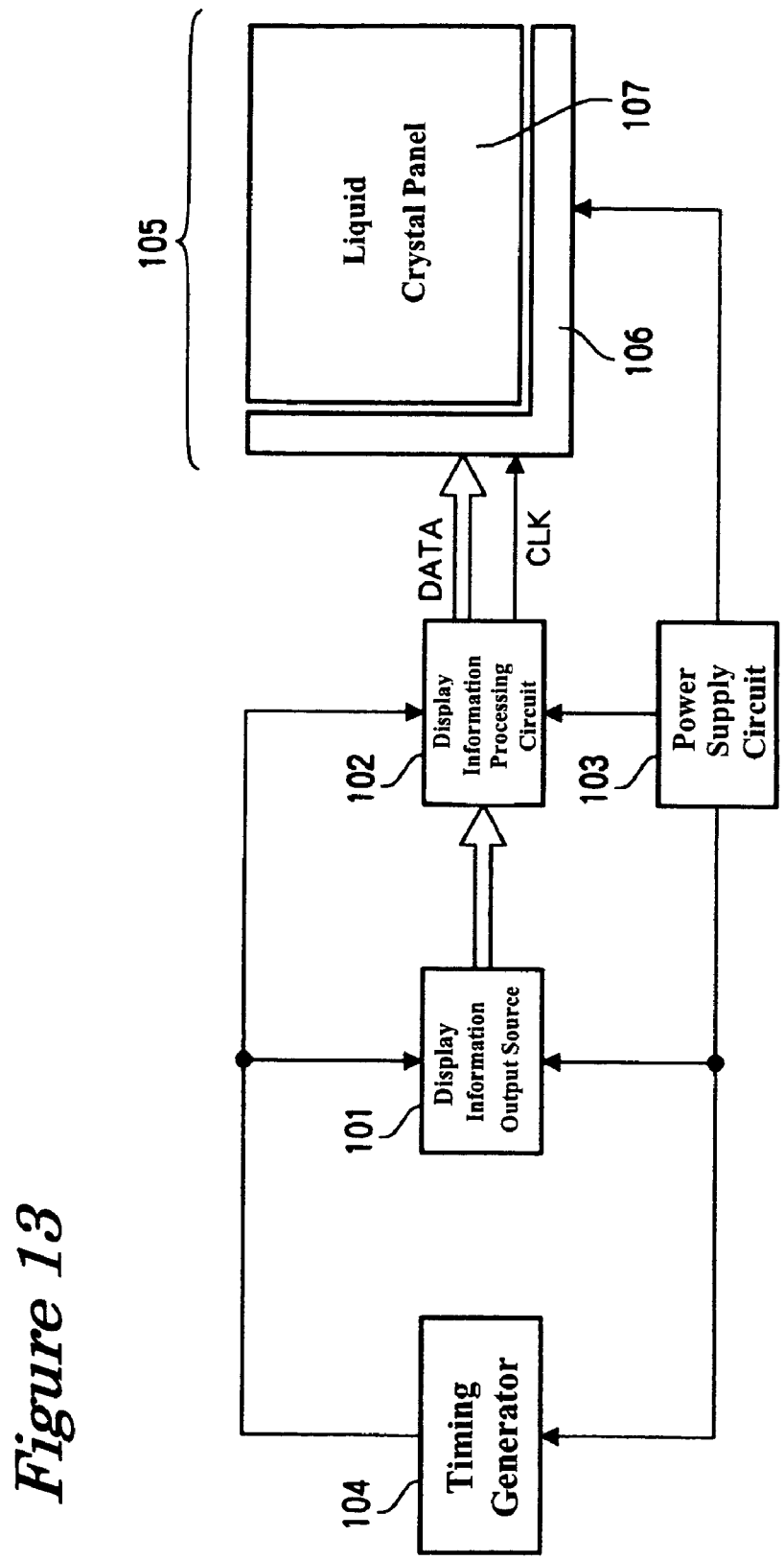
FIG. 13 is a block diagram of an electronic equipment in accordance with an embodiment of the present invention.

FIG. 13 shows an electronic equipment in accordance with an embodiment of the present invention. The electronic equipment includes a display information generator 101, a display information processing circuitry 102, a power supply circuitry 103, a timing generator 104 and a liquid crystal device 105. The liquid crystal device 105 further includes a liquid crystal panel 107 and a driver circuitry 106.

The display information generator 101 includes a memory such as a RAM (random access memory), a storage unit such as various discs, and a synchronizing circuitry for synchronizing digital image signals and others. The display information generator 101 supplies display information such as image signals to the display information processing circuitry 102 in a prescribed format, in accordance with various clock signals that are generated by the timing generator 104.

Next, the display information processing circuitry 102 includes various known circuitries such as amplifying and inverting circuitries, rotation circuitries, gamma correction circuitries, and clamping circuitries. The display information processing circuitry 102 processes display information that has been received, and supplies image signals, together with a clock signal CLK, to the driver circuitry 106. Here, a scanning line driver circuitry (not illustrated), a data line driver circuitry (not illustrated), an inspection circuitry and various other circuitries are collectively referred to as the driver circuitry 106. The power supply circuitry 103 supplies prescribed power voltages to all foregoing components. The liquid crystal device 105 may be, for instance, constituted in the same manner as the liquid crystal device 1 shown in FIG. 4.

Figure 14:
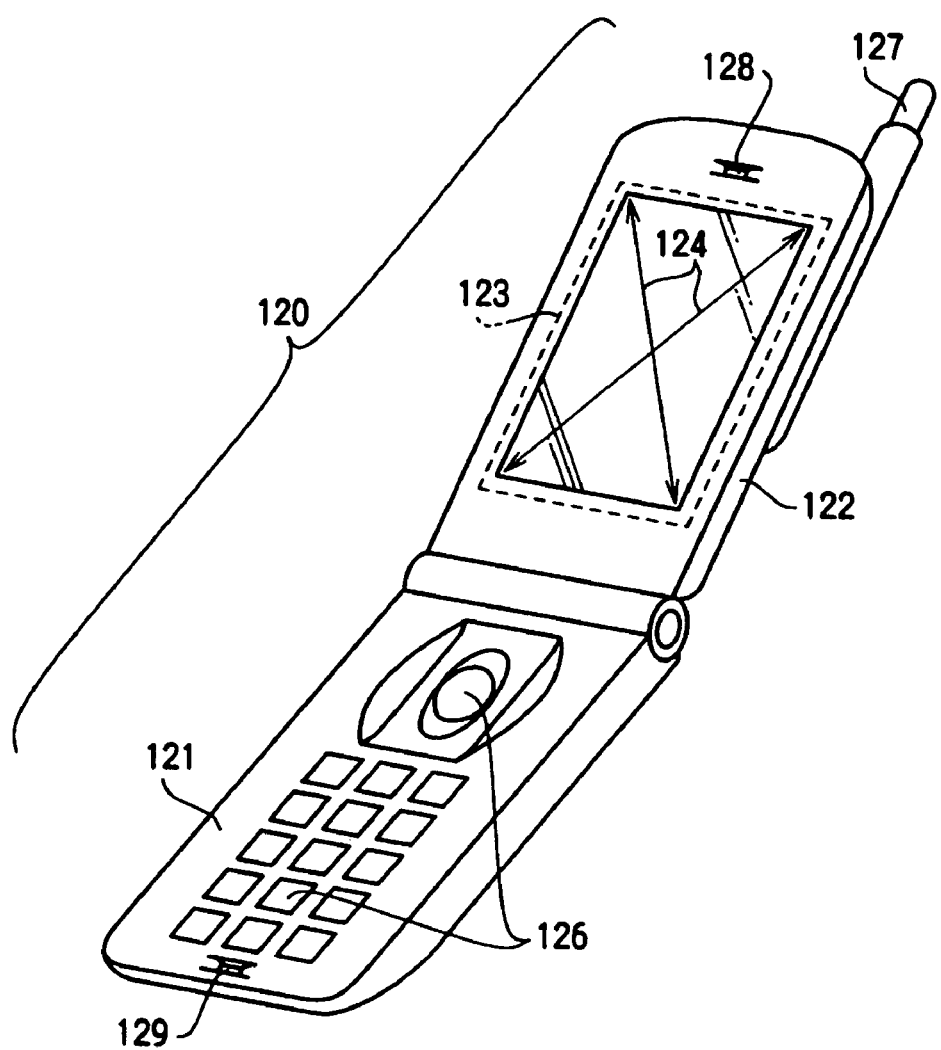
FIG. 14 is an oblique view of a portable telephone set, which is an example of electronic equipment in accordance with an embodiment of the present invention.

FIG. 14 shows a portable telephone set as an example of an electronic equipment in accordance with the embodiment of the present invention. A portable telephone set 120, as shown, includes a main body 121 and a display unit 122 that is mounted to the main body 121 so as to be opened and closed relative thereto. A display device 123 having a liquid crystal device or other electro-optical device in accordance with embodiments described above is disposed within the display unit 122, such that the display unit 122 can display various displays relating to telephone communications at the display screen 124. Operation buttons 126 are mounted in rows on the front face of the man body 121.

An antenna 127 is retractably attached to one end of the display unit 122. A loudspeaker is disposed inside a voice receiver section 128, and a microphone is installed inside a voice transmitter section 129. The control section that controls the operation of the display device 123 is disposed within a main unit 121 or the display unit 122 either integrally with or separately from a control section that controls the entire portable telephone set 120.

Figure 15:
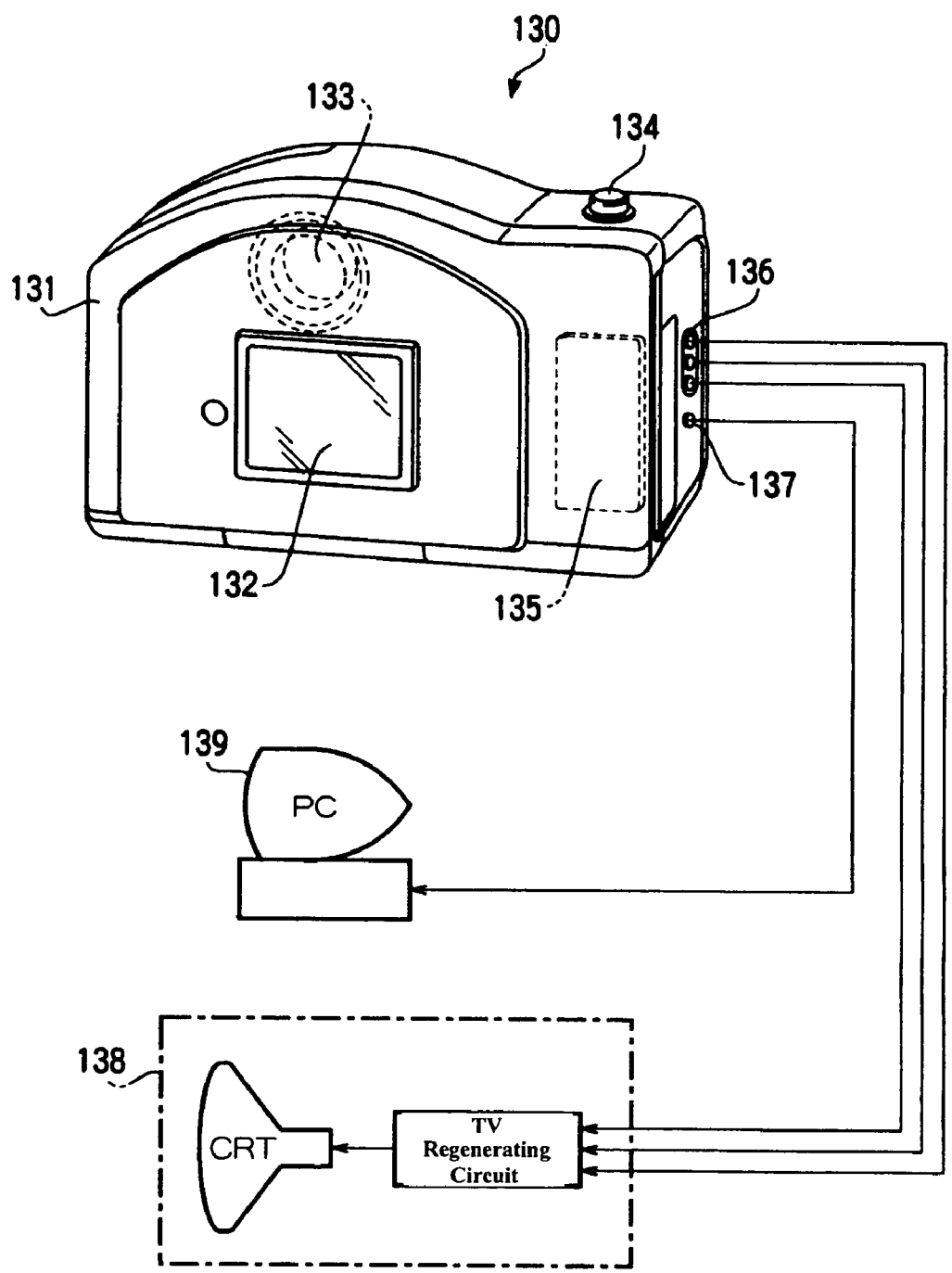
FIG. 15 is an oblique view of a digital camera, which is an embodiment of electronic equipment related to the invention.

FIG. 15 shows a digital camera as another example of the electronic equipment in accordance with the present embodiment of the present invention. The digital camera has a liquid crystal device as a viewfinder. A liquid crystal display unit 132 is disposed on a surface of a case 131. Here, the liquid crystal display unit 132 functions as a viewfinder that displays the object to be photographed. The liquid crystal display unit 132 may be, for instance, a liquid crystal device 1 shown in FIG. 4.

The digital camera 130 further includes, on the front side (the back side of the drawing) of the case 131, a light receiving unit 133 having optical lenses and CCD (Charge Coupled Device). When a photographer, having verified an image of the object displayed on the liquid crystal display 132 unit, presses a shutter button 134, the CCD image signal of the particular instant is transferred to and stored in a memory on a circuit substrate 135.

A video signal output terminal 136 and a data communications input-output terminal 137 are disposed on a side surface of the case 131. A television monitor 138 is adapted to be connected to the video signal output terminal 136 as necessary. A personal computer 139 is also adapted to be connected to the data communications input-output terminal 137 as necessary. The image signal stored in a memory on the circuit substrate 135 is sent out to the television monitor 138 or the personal computer 139 through prescribed operations.

In the liquid crystal display device used in the aforementioned electronic equipment, the bank 15 itself, which frames the coloring elements 16, includes the transmissive portions 15a such that an exposed region of the reflective film 12 is disposed at the bank 15, and the light reflected by the reflective film 12 through the exposed region brightens the color display in the reflective display mode. Moreover, as the bank 15 itself functions as a transparent region, there is no need for forming an exposed region of the reflective film 12 inside the coloring elements 16. Therefore, it is possible to obtain a display with well saturated colors.

MODIFICATION OF ELECTRONIC EQUIPMENT

In addition to a telephone set and digital camera explained in the foregoing, the present invention is applicable to other electronic equipments such as personal computers, wristwatch type electronic equipments, PDAs (personal digital assistants), liquid crystal television sets, viewfinder type or direct-view monitor type video tape recorders, automobile navigation devices, pagers, electronic notebooks, portable calculators, word processing devices, workstations, television telephone sets, and POS terminal equipments.

The present invention was described above with reference to preferred embodiments, but the present invention is not limited to these embodiments, and various improvements can be made within the scope of the present invention as described in the claims.

The color filter substrate in accordance with the present invention is used to provide a color display function in a liquid crystal device, an organic EL device, or other such electro-optical device. Also, the electro-optical device in accordance with the present invention is preferably used as a display section of a portable phone, a portable information terminal, a PDA, or other such electronic equipment. Also, the electronic equipment in accordance with the present invention may be a portable phone, a portable information terminal, a PDA, or other such electronic equipment, and is particularly configured as an electronic equipment with a function whereby various data can be visually displayed.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-318438. The entire disclosure of Japanese Patent Application No. 2003-318438 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A color filter substrate comprising
a transmissive base;
a reflective film formed over said base;
a plurality of coloring elements having different colors and formed on said reflective film; and
a plurality of banks formed on said reflective film between said plurality of coloring elements; at least one of said banks having a transmissive portion and a non-transmissive portion.

2. The color filter substrate member as set forth in claim 1, wherein
an area of said transmissive portion is determined based on a color of said coloring element that is adjacent to said transmissive portion.

3. The color filter substrate as set forth in claim 2, wherein
a coloring element of a first color requires a transparent region whose area is $A_1$,
a coloring element of a second color requires a transparent region whose area is $A_2$, and
an area of a transmissive portion of a bank that is adjacent to said coloring element of the first color and the coloring element of said second color is $A_1/2+A_2/2$.

4. The color filter substrate as set forth in claim 1, further comprising
a light blocking member formed on said reflective film at one of first and second directions edges of said coloring elements, the first direction intersecting with the second direction,
said bank being formed at the other of the first and second directions edges of said coloring elements.

5. The color filter substrate member as set forth in claim 1, wherein
widths of said plurality of banks are constant regardless of colors of said coloring element that are adjacent to said banks.

6. The color filter substrate of as set forth in claim 1, wherein
said transmissive portion and said non-transmissive portion are disposed alternately within a bank.

7. The color filter substrate as set forth in claim 1, wherein
said plurality of coloring elements has three colors, and
said coloring elements are disposed such that their colors form a stripe-like pattern.

8. The color filter substrate of as set forth in claim 1, wherein
said color filter substrate is adapted to be disposed opposite an element substrate that has a plurality of line wirings therein,
said banks are adapted to be disposed opposite the line wirings, and
said banks are sized to be thicker than the line wirings.

9. The color filter substrate as set forth in claim 8, wherein,
a coloring element of a first color requires a transparent region whose area is $A_1$,
a coloring element of a second color requires a transparent region whose area is $A_2$,
an area of said line wiring is $A_L$, and
an area of a transmissive portion of a bank that is adjacent to said coloring element of the first color and said coloring element of the second color is $A_1/2+A_2/2+A_L$.

10. The color filter substrate of as set forth in claim 1, wherein
said plurality of coloring elements is formed by depositing droplets of a prescribed liquid with a discharging device.

11. An electro-optical apparatus comprising:
said color filter substrate as set forth in claim 1; and
an electro-optical layer provided on said color filter substrate.

12. An electronic equipment comprising:
said electro-optical apparatus as set forth in claim 11; and
controlling means for controlling said electro-optical apparatus.

* * * * *